(12) United States Patent
Matusmoto

(10) Patent No.: US 7,689,018 B2
(45) Date of Patent: Mar. 30, 2010

(54) ANOMALY DETECTION IN VOLUME DATA STRUCTURE INFORMATION

(75) Inventor: Kazuhiko Matusmoto, Minato-ku (JP)

(73) Assignee: Ziosoft, Inc., Tokyo (JP)

( * ) Notice: Subject to any disclaimer, the term of this patent is extended or adjusted under 35 U.S.C. 154(b) by 988 days.

(21) Appl. No.: 11/435,398

(22) Filed: May 16, 2006

(65) Prior Publication Data
US 2007/0053564 A1 Mar. 8, 2007

(30) Foreign Application Priority Data
Sep. 5, 2005 (JP) ............... 2005-256883

(51) Int. Cl.
*G06K 9/00* (2006.01)
(52) U.S. Cl. .................................. 382/128
(58) Field of Classification Search ......... 382/128–134; 128/920–930; 250/455–465; 356/39–49; 600/407, 408, 409, 410, 411, 412, 413, 414, 600/424, 425, 426
See application file for complete search history.

(56) References Cited
U.S. PATENT DOCUMENTS
2004/0249270 A1  12/2004  Kondo et al.
2005/0010100 A1*  1/2005  Hornegger et al. .......... 600/407
2006/0149511 A1*  7/2006  Kaus et al. .................... 703/2

FOREIGN PATENT DOCUMENTS
JP  09-299366  * 11/1997
JP  2004-283373 A  10/2004

OTHER PUBLICATIONS
Machine translation for JP-09-299366.*
Japanese Office Action for 2005-256883.

* cited by examiner

*Primary Examiner*—Samir A. Ahmed
*Assistant Examiner*—Atiba O Fitzpatrick
(74) *Attorney, Agent, or Firm*—Pearne & Gordon LLP

(57) ABSTRACT

Failure part is detected using calculated structure information. In one embodiment, the failure part is detected by comparing path node positions, numbers of node positions, branch lengths, and branch positions. That is, it is detected that although nodes a2 and a3 exist in structure information N in phase N, corresponding nodes do not exist in the preceding phase N−1 or the subsequent phase N+1. Moreover, it is detected that a node a1 existing in the preceding phase N−1 and a node a5 existing in the subsequent phase N+1 do not exist in a corresponding part a4 in the structure information N in the phase N.

20 Claims, 8 Drawing Sheets

ANOMALY DETECTION IN VOLUME DATA STRUCTURE INFORMATION

This application claims foreign priority based on Japanese Patent application No. 2005-256883, filed Sep. 5, 2005, the content of which is incorporated herein by reference in its entirety.

BACKGROUND OF THE INVENTION

1. Field of the Invention

This invention relates to an image processing method and a computer readable medium for image processing for generating an image of a lesion part, an organ, etc., from volume data obtained by various image diagnosis apparatuses such as an X-ray CT (Computed Tomography) apparatus and an MRI (Magnetic Resonance Imaging) apparatus for medical use.

2. Description of the Related Art

Various image diagnosis apparatuses such as the X-ray CT apparatus and the MRI apparatus generate tomographic images of an inspection part from the volume data of a subject, and display an image on a monitor screen for diagnosis. For example, in a case of an organ of a circulatory system such as a heart or a vessel or any other moving organ, motions of tissues forming the organ are observed according to the tomographic images, and function of the organ, etc., is diagnosed.

As it is made possible to provide a high-resolution image in a short time by such an image diagnosis apparatus, a region of interest of an organ, a tumor, etc., is extracted from the obtained volume data. Furthermore, the region of interest is visualized in so as to be easily viewed or is quantified for measuring an area or a volume, whereby it is serviceable to diagnosis of the lesion part.

Hitherto, region extraction from volume data has been executed three-dimensionally with respect to the volume data. When a group of volume data including a plurality of phases (each phase corresponds to each volume data) exists, region extraction has been executed for each of the phases. The region extraction is to obtain a region of interest in each volume data. A plurality of volume rendering images according to the plurality of phases of volume data is displayed in order, whereby a moving image can be obtained.

FIG. 7 is a flowchart of an image processing method in a related art. In the image processing method in the related art, first a group of volume data V1 to Vn including a plurality of phases are acquired using the image diagnosis apparatus (step S21). Next, precise region extraction of the volume data V1 is executed so as to obtain reference data, and a region M1 is obtained (step S22). Then, registration (motion compensation, position adjustment, etc.) on the volume data V1 to the volume data Vn is performed (step S23).

Next, region extractions of the volume data V2 to the volume data Vn are executed using the extraction region M1 of the volume data V1 as the reference data, and regions M2 to Mn are obtained (step S24). Next, differential between regions among the regions M1 to Mn are respectively obtained, and the differentials are used so as to obtain an abnormal phase (phase wherein region extraction seems to results in failure) (step S25). When the abnormal phase is detected, the region extraction with new parameters is repeated until the abnormal phase no longer exists.

On the other hand, as for a two-dimensional region extraction method of executing the region extraction of a tissue in an ultrasonographic image, a slice image of an MRI image, etc., a method of performing extraction processing for each phase and then detecting erroneous extraction is known. That is, contours are extracted in each frame, areas (or volumes) of regions inside the contours are obtained, time changes in the areas (or volumes) are observed, and contour extraction is performed again for the part where abrupt change is observed (For example, refer to JP-A-9-299366).

However, in the image processing method in the related art shown in FIG. 7, a user command and an enormous amount of calculation are required for obtaining the region M1 by executing the precise region extraction of the volume data V1 at step S22. In order to perform the registration (motion compensation, position adjustment, etc.) on the volume data V1 to the volume data Vn at step S23, the user command and the enormous amount of calculation are also required. Further, the differential of regions between regions among the regions M1 to Mn are respectively obtained, and are used so as to obtain the abnormal phase at step S25. However, when deformation of the organ occurs while photographing, the abnormal phase cannot be obtained. This is because the differential region is obtained by making a comparison of raster data, and thus particularly when time resolution of a moving image is insufficient, correspondence between the regions is lost. For example, when a vessel moves in an image, and any part of the vessel does not exist in the same coordinates for each phase, continuity of raster data in the time direction does not exist and therefore it is difficult to detect the abnormal phase by the method in the related art.

In the image processing method in the related art, the precise extraction region information is created only for one phase as the reference, and the precise extraction result is used as the reference data in other phases. Therefore, it is difficult to make a comparison between the extraction results in other phases so as to detect an error. That is, the extraction result in each phase depends on the extraction region information as the reference.

In the image processing method in the related art, it is required that the calculation result at a first stage, particularly in the reference phase, be precise. Therefore, a great deal of calculation time and user labor for checking are taken, and the image of the region of interest cannot be displayed with good responsivity.

FIGS. 8A and 8B show images of executing region extraction of a heart and a vessel on a plurality of volume data in continuous time (phases 1 to 3). FIG. 8A shows ideal extraction results in phases 1 to 3. FIG. 8B shows actual extraction results in phases 1 to 3.

In the image processing method in the related art, the regions are compared directly as raster data, and thus particularly with respect to volume data, calculation amount increases and it becomes difficult to perform the registration. Therefore, it is difficult to perform a correction of region extraction result when the organ is being deformed in time series just by using the preceding and subsequent phases. Therefore, extraction failure parts are often generated as shown in phase 2 of the actual extraction results in FIG. 8B. Furthermore, most of registration algorithms require some region extraction result itself, in the processing process. It is difficult to provide sufficient registration in a state in which the region extraction result is not obtained.

SUMMARY OF THE INVENTION

The present invention has been made in view of the above circumstances, and provides an image processing method and a computer readable medium capable of detecting an anomaly in images in a plurality of phases with small calculation amounts.

In some implementations, an image processing method of the invention comprises: acquiring structure information from each volume data in a group of volume data including a plurality of phases, each of the structure information corresponding to each volume data in the group of volume data; and detecting an anomaly in the structure information by comparing the structure information with each other.

According to the described configuration, a comparison is made between the structure information respectively obtained from each of the volume data so as to detect the anomaly in the structure information. Thus, need for performing calculations of motion compensation, precise region extraction, etc., as in the related art is eliminated, so that the anomaly in images corresponding to the plurality of phases can be detected in small calculation amounts.

In the image processing method of the invention, the structure information includes path information of a vessel, etc. In the image processing method of the invention, the structure information includes surface information of the surface of an organ, etc. In the image processing method of the invention, the structure information includes coordinate information of center coordinates of a tissue, etc.

According to the described configuration, region extraction is executed using the path information of a vessel, etc., the surface information of the surface of an organ, etc., and the coordinate information of the center coordinates of a tissue, etc., so that the calculation amount to detect a failure part can be decreased and a precise image can be created in a short time.

In the image processing method of the invention, the phases are in time-series. In the image processing method of the invention, the structure information corresponding to one among the group of volume data is compared with the structure information corresponding to at least one of the volume data of the preceding phase and the subsequent phase in time-series.

According to the described configuration, the group of volume data includes the time-series data, and the structure information of the preceding phase and the subsequent phase of the time-series data are used for determination of the anomaly, so that processing for detecting the anomaly in the structure information is simplified.

The image processing method of the invention further includes generating region information from the structure information. The image processing method of the invention further includes re-calculating the structure information corresponding to the phase in which the anomaly is detected in the structure information.

According to the described configuration, the region information is generated from the structure information, and when an abnormal phase is detected, the structure information corresponding to the abnormal phase is re-calculated, so that a precise image can be created in a short time with a small calculation amount.

In some implementations, a computer readable medium of the invention having a program including instructions for permitting a computer to perform image processing, said instructions comprising: acquiring structure information from each volume data in a group of volume data including a plurality of phases, each of the structure information corresponding to each volume data in the group of volume data; and detecting an anomaly in the structure information by comparing the structure information with each other.

According to the invention, a comparison is made between the structure information respectively obtained from a plurality of groups of the volume data so as to detect the phase having an anomaly. Thus, a need for performing calculations of motion compensation, precise region extraction, etc., as in the related art is eliminated, so that the calculation amount can be decreased in detecting an anomaly in images corresponding to a plurality of phases.

DESCRIPTION OF THE PREFERRED EMBODIMENTS

Next, an image processing method of the invention and an image processing program of the invention stored in a computer readable medium will be discussed in detail with reference to the accompanying drawings.

In an image processing method according to embodiments of the invention, for example, volume data of a heart is obtained for each predetermined phase from any of various image diagnosis apparatuses such as an X-ray CT apparatus and an MRI apparatus, and the obtained volume data are stored in a memory. The volume data once stored in the memory is read from the memory, and a region of interest is extracted by a predetermined algorithm.

First Embodiment

Figure 1:
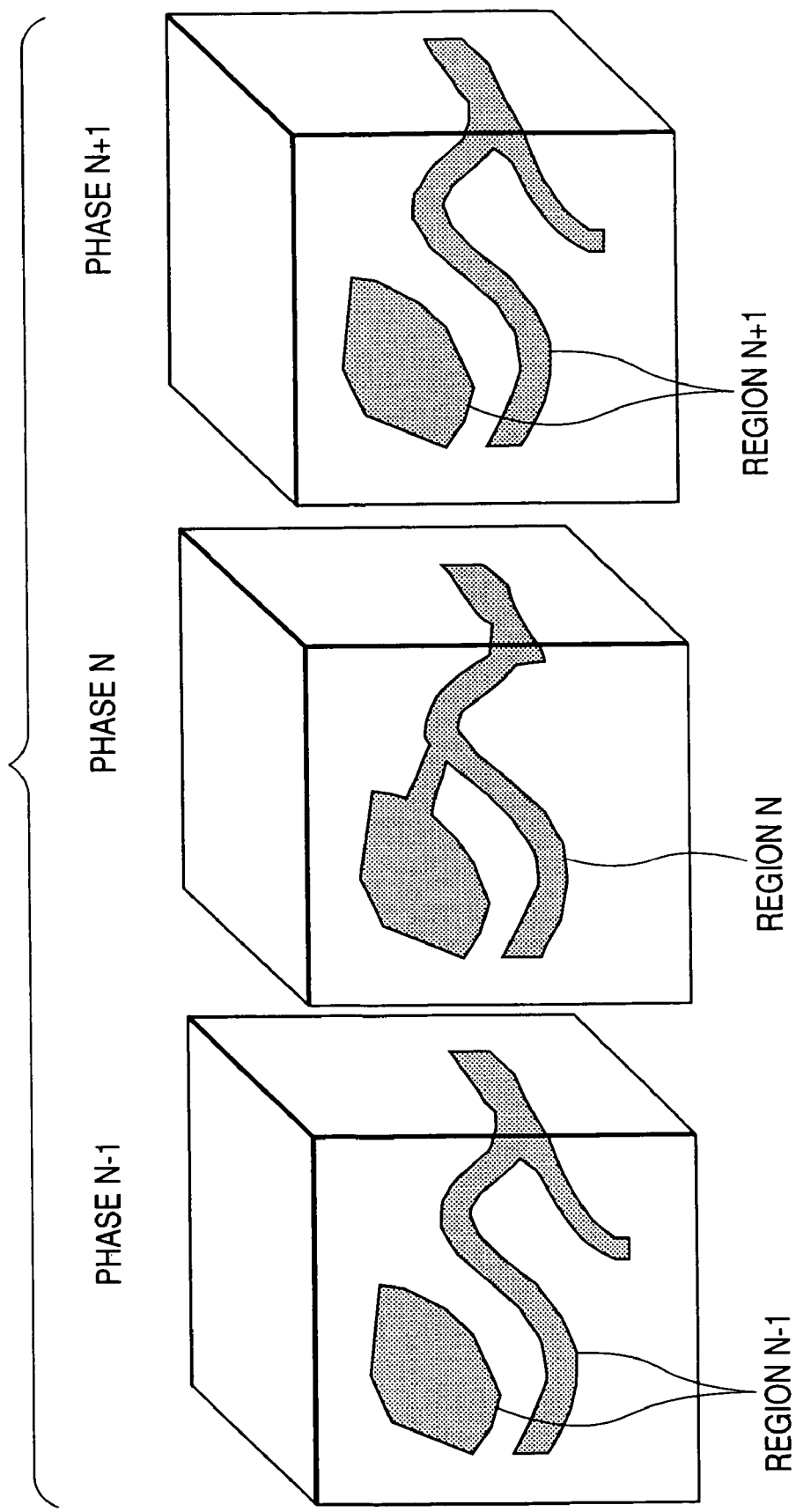
FIG. 1 is a schematic representation to show a case where a region of interest of a heart and a vessel, for example, is extracted in an image processing method of a first embodiment of the invention.

FIG. 1 shows a case where a region of interest of a heart and a vessel, for example, is extracted in the image processing method of a first embodiment. From image data in each phase, the region is extracted using an existing method (3D region growing method, etc.,) and a mask representing the extraction region is created. That is, region N−1 is extracted in phase N−1, region N is extracted in phase N, and region N+1 is extracted in phase N+1.

Figure 2:
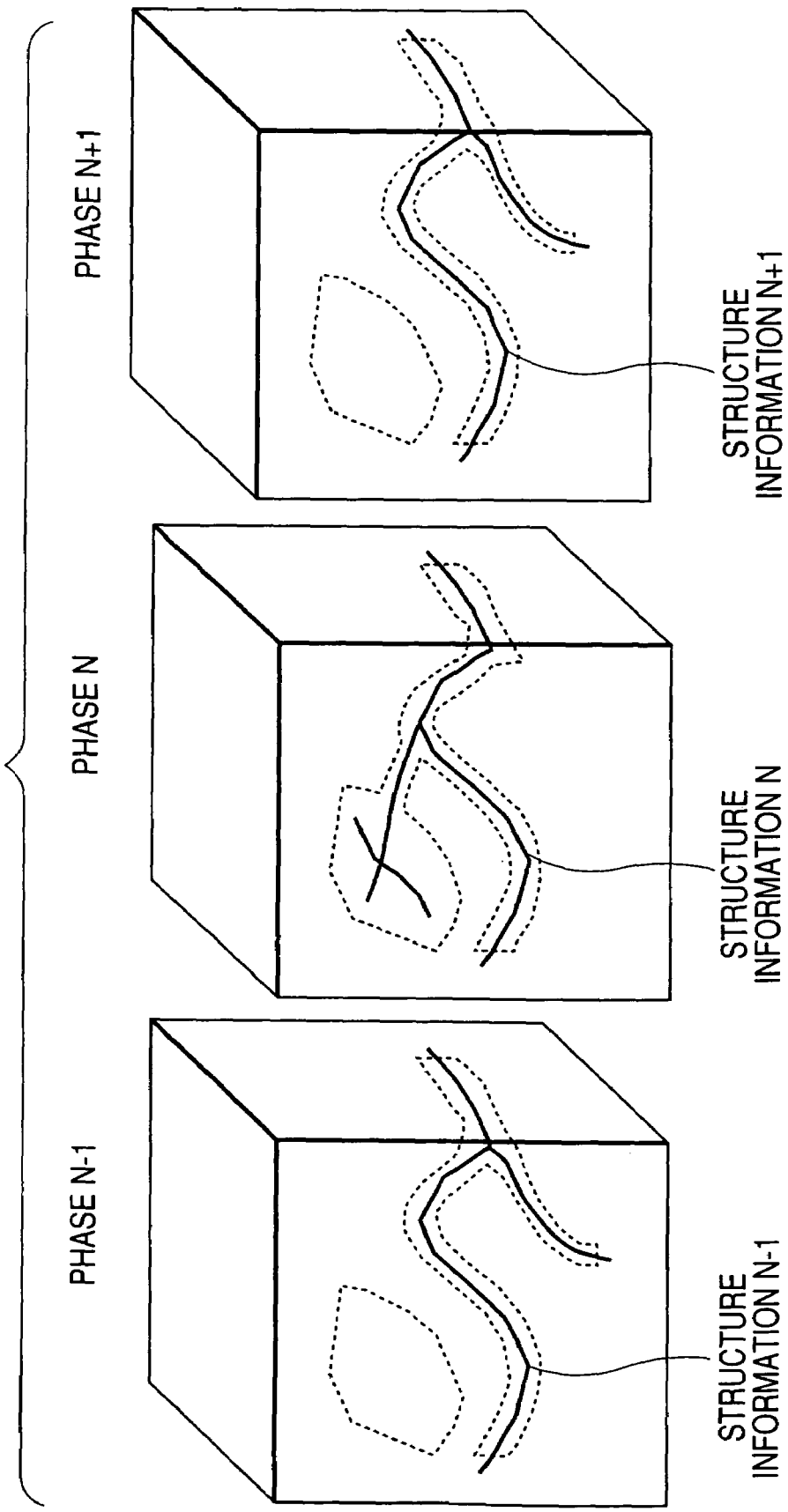
FIG. 2 is a schematic representation of calculating structure information from an extraction region and obtaining a tree-like path in the image processing method of a first embodiment of the invention.

Next, structure information of a tissue is calculated from the extraction result. FIG. 2 shows how the structure information is calculated by performing skeltonization on the extraction regions, and a tree-like path (graph) is obtained in the image processing method of the embodiment. That is, structure information N−1 representing a center line of the vessel, etc., is calculated from the data in phase N−1, structure information N is calculated from the data in phase N, and structure information N+1 is calculated from the data in phase N+1.

Figure 3:
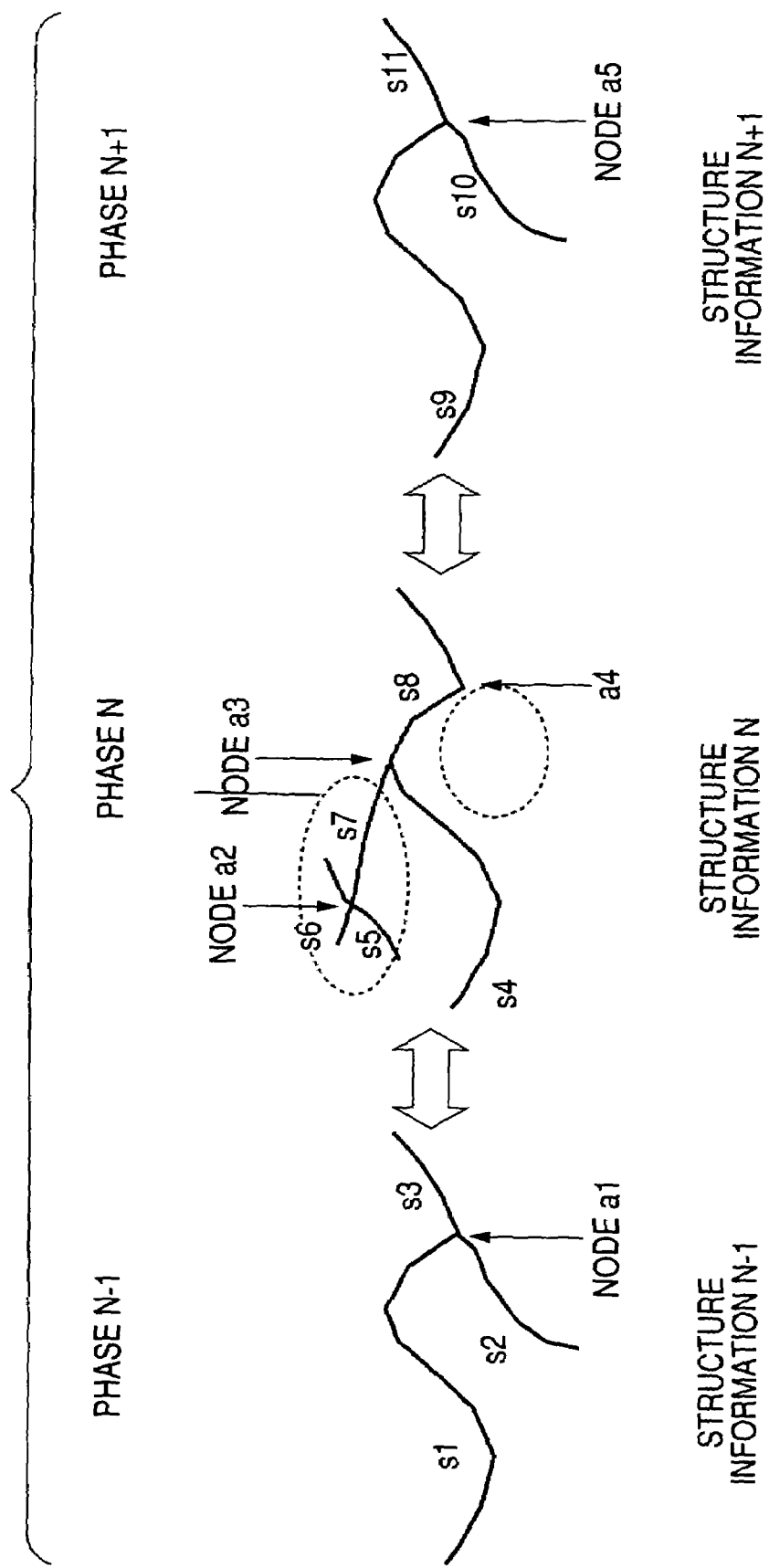
FIG. 3 is a schematic representation of detecting a failure part by comparing path node positions, a number of the node positions, branch lengths, and branch positions.

Next, the calculated structure information is used to detect a failure part. FIG. 3 shows how the failure part is detected by comparing path node positions, a number of node positions, branch lengths, and branch positions. That is, it is detected that although nodes a2 and a3 exist in the structure information N in the phase N, corresponding nodes do not exist in the preceding phase N−1 or the subsequent phase N+1. Also, it is detected that a node a1 existing in the preceding phase N−1 and a node a5 existing in the subsequent phase N+1 do not exist in the corresponding part a4 in the structure information N in the phase N. The corresponding node can also be determined by making a comparison between coordinates of the node a1 and coordinates of the node a3 respectively corresponding to branches s1 and s4, for example. Further, the corresponding node can also be determined by making a comparison between the number of branches connected to the node a1 and that to the node a3. Further, the corresponding node can also be determined by making a comparison between the length and direction of each branches connected to the node a1 and those to the node a3. In the comparison, it may be determined that an anomaly occurs when each element exceeds a given range, or when a total score of respective elements exceeds a given range, which is obtained by using a function which converts elements to a dimensionless score.

Thus, a node to which any node in the preceding phase or the subsequent phase does not correspond is detected as a failure part, and a part where a node which has to exist does not exist is detected as a failure part. The structure information obtained according to the region extraction result for each phase is corrected using the structure information obtained according to the region extraction results in the preceding phase and the subsequent phase, and region extraction is again executed by using the anomaly information. If the extraction processing is again performed on the abnormal phase under the same condition, only the same abnormal extraction result is obtained. Therefore, when executing again the region extraction, the condition is changed for performing the extraction processing. For example, in the 3D region growing method, threshold value defining a boundary and calculation start coordinates are used as the conditions, and thus they are changed. At this time, when the abnormal phase is compared with a normal phase and it can be determined that the extraction region in the abnormal phase is too small, the threshold value is lowered so that a larger region can be acquired. When the abnormal phase is compared with the normal phase and it can be determined that the extraction region in the abnormal phase is too small, the calculation start coordinates can be selected from the region contained in the normal phase. A comparison is made between the normal phase and the abnormal phase, and re-calculation can be performed only on the region containing a difference and a periphery thereof. In doing so, it is made possible to divide the phase wherein extraction processing cannot be performed effectively under a single condition, into portions so as to perform calculation under respective conditions.

In this case, anisotropy of space direction and time direction is used, unlike what is called a 4D region growing method provided by extending the 3D region growing method, which is one of the three-dimensional general region extraction methods, just to four dimensions mathematically. That is, the fact that the structure information is given in the space direction and the structure information changes in the time direction is used.

In the image processing method in the related art, it is required that the calculation result at the first stage, particularly in the reference phase be precise, and therefore a great deal of calculation time and user labor for checking are necessary. In the image processing method of the embodiment, however, the necessity for performing the calculation precisely at the first stage is small, and thus the efficiency is enhanced, and the need of performing the registration in advance is eliminated.

In the related art, the region extraction in the subsequent phase is executed based on the region extraction result in the preceding phase. In the embodiment, however, region extraction is performed independently in each phase, and then a comparison is made between the extraction results so as to detect an error. Thus, for example, the extraction result is once displayed on a screen, and then corrections can be made by taking time so as to gradually enhance the extraction accuracy.

In the related art, by using the extraction region, motion compensation is previously conducted and then extraction and comparison are executed. However, it is very difficult to conduct the motion compensation at the stage. On the other hand, in the embodiment, the structure information is obtained from the extraction region and used in such a manner that the center line of the vessel is obtained and a comparison is made between the center lines, for example. By using the structure information, in performing the region extraction of a predetermined biological part from the volume data, the phase containing a failure part can be obtained with a small calculation amount. Since re-calculation can be performed in the phase in which the structure information has the failure part, more precise region extraction can be accomplished.

Second Embodiment

Figure 4:
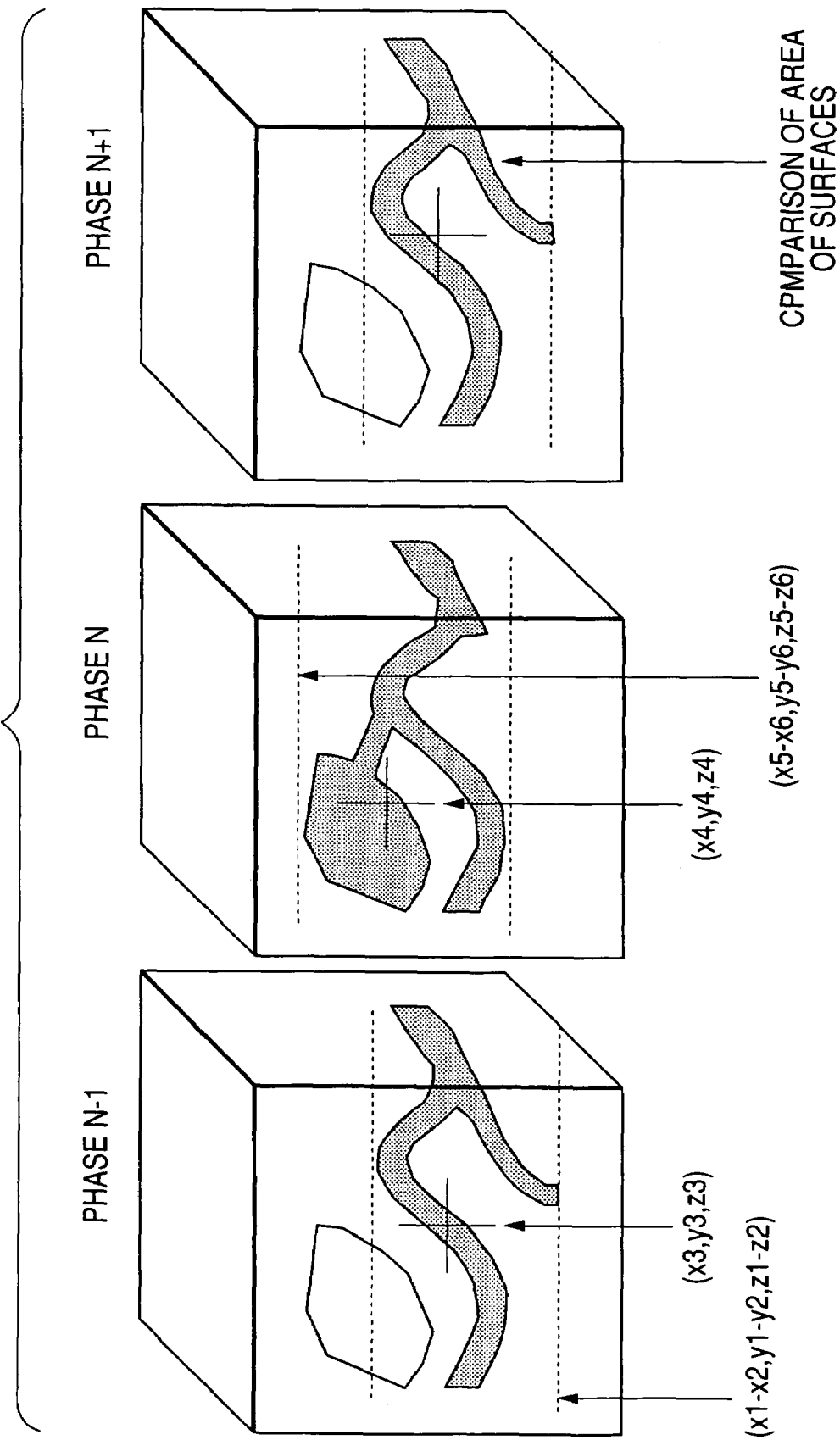
FIG. 4 is a schematic representation to show how a region extraction failure is detected by detecting changes in position coordinates of a tissue in the image processing method of a second embodiment of the invention.

FIG. 4 shows how a failure in the region extraction is detected by detecting changes in the coordinates of a tissue in the image processing method of a second embodiment. For example, range coordinates of an extraction region or coordinates of the center of gravity of the region are obtained in each phase. That is, the range coordinates (x1-x2, y1-y2, z1-z2) (from x1 to x2, from y1 to y2, from z1 to z2) of an extraction region or the coordinates of the center of gravity (x3, y3, z3) of the region are obtained in the phase N−1, and the range coordinates (x5-x6, y5-y6, z5-z6) of an extraction region or the coordinates of the center of gravity (x4, y4, z4) of the region are obtained in the phase N.

In this case, when the region extraction results in failure, the coordinates of the center of gravity (x4, y4, z4) and the range coordinates (x5-x6, y5-y6, z5-z6) largely move as shown in the phase N. Accordingly, a failure in the region extraction is detected. In addition, a comparison may be made between volumes of the regions in the subsequent phases or area of the surfaces of the regions in the subsequent phases.

According to the image processing method of the embodiment, the structure information such as the range coordinates of the region and the barycentric coordinates of the region are used to execute the region extraction, whereby re-calculation of the region extraction of a failure part can be performed. Therefore, more precise region extraction can be accomplished. In addition, based on a number of detected failure parts, reliability of the region extraction result can be determined. For example, when the number of detected failure parts is zero, it can be estimated that the region extraction result is accurate; when the number of detected failure parts is large, it can be estimated that the reliability of the region extraction result is low.

Third Embodiment

Figure 5:
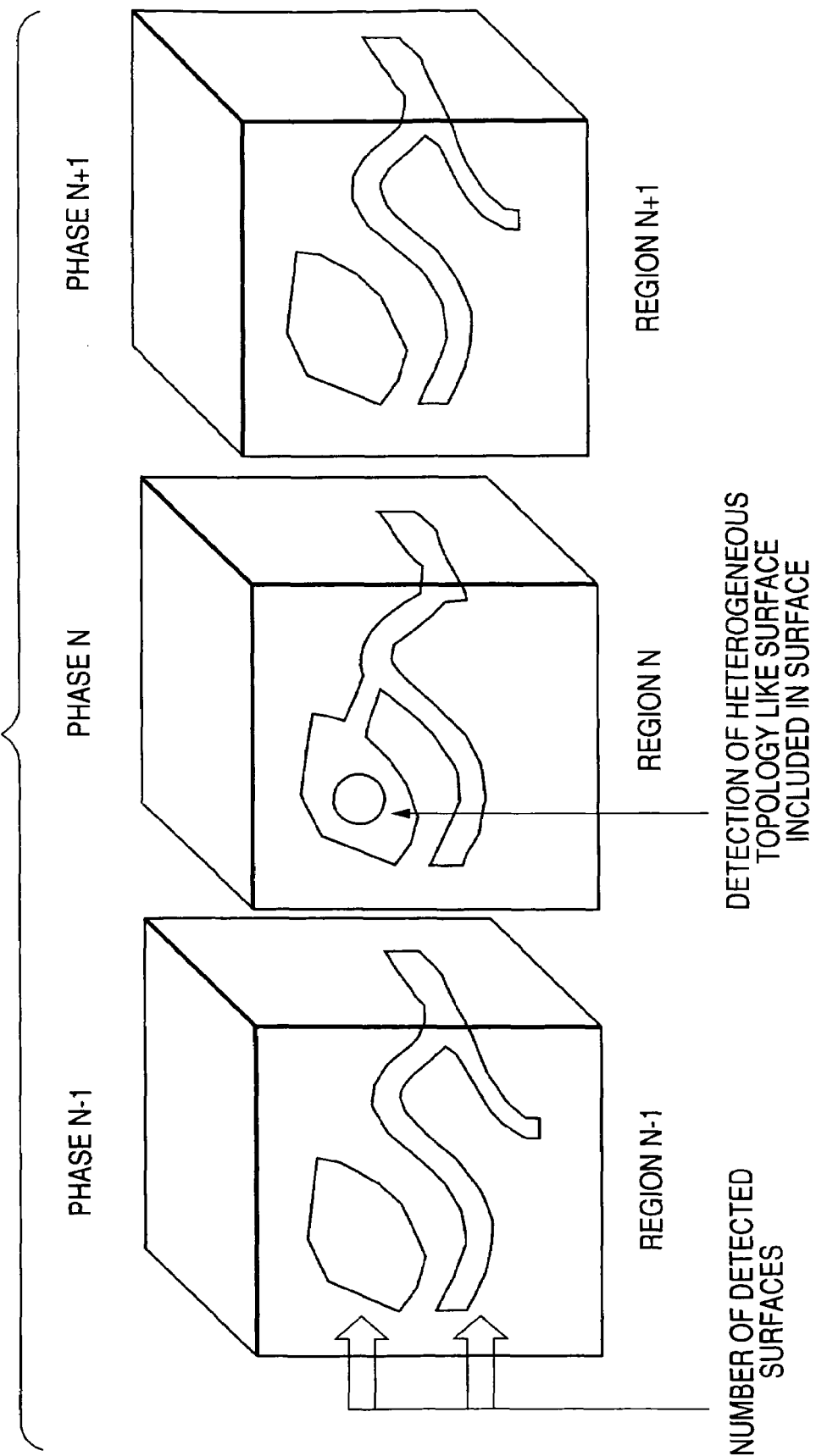
FIG. 5 is a schematic representation to show how a region extraction failure is detected by detecting changes in surface information of a tissue in the image processing method of a third embodiment of the invention.

FIG. 5 shows how a failure in the region extraction is detected by detecting changes in surface information of a tissue in the image processing method of a third embodiment. For example, number of surfaces is detected for each phase, or heterogeneous topology like a surface included in a surface is detected for each phase, and a comparison is made in the preceding and subsequent phases. When the number of surfaces or the topology changes in the preceding and subsequent phases, a failure in the region extraction is detected.

According to the image processing method of the embodiment, when the structure information of the number of surfaces, the topology, etc., in the preceding and subsequent phases change, namely, when an anomaly in the structure information is detected, a failure in the region extraction is detected. Thus, reliability of the region extraction result can be determined. Since the re-calculation of the region extraction of the failure part can be performed, more precise region extraction can be accomplished.

Figure 6:
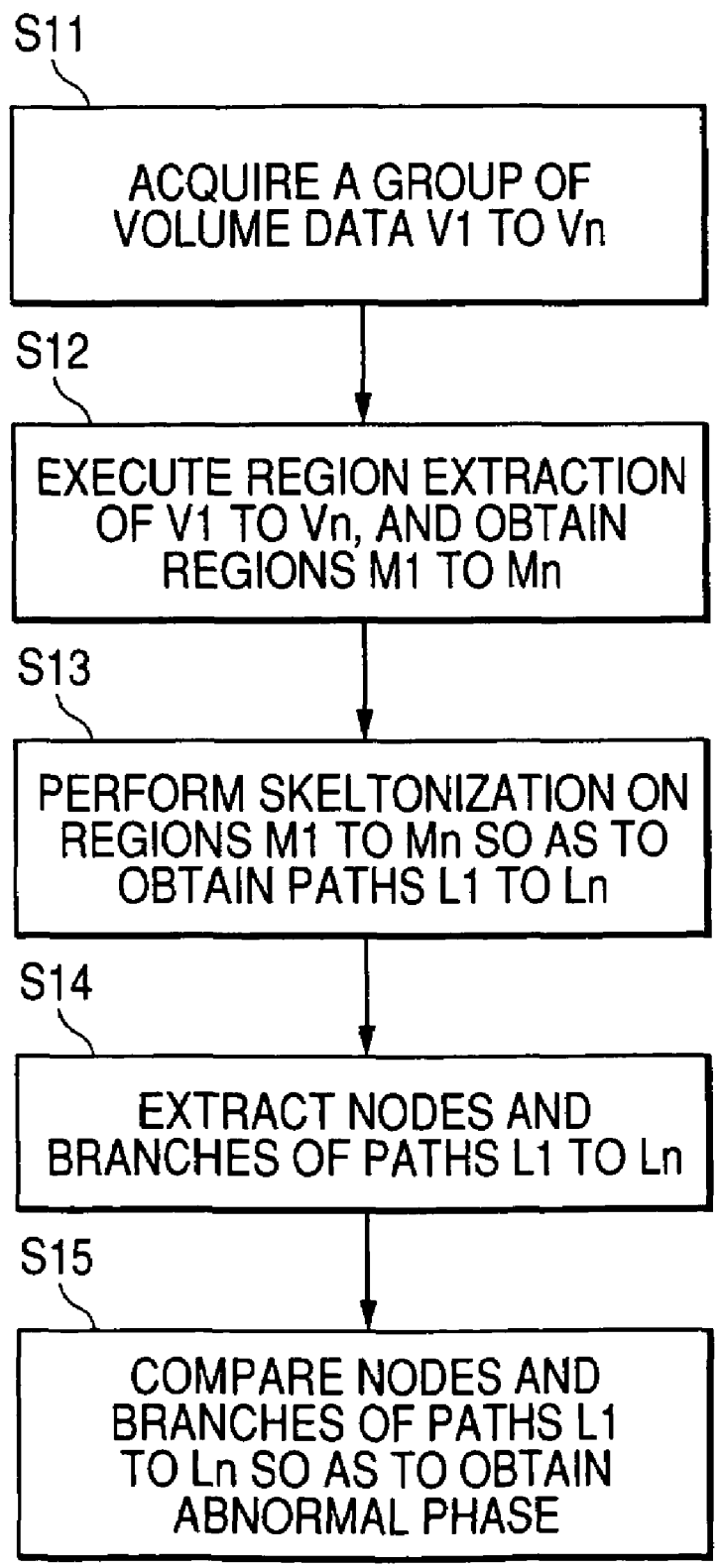
FIG. 6 is a flowchart of the image processing method of a third embodiment of the invention.
Figure 7:
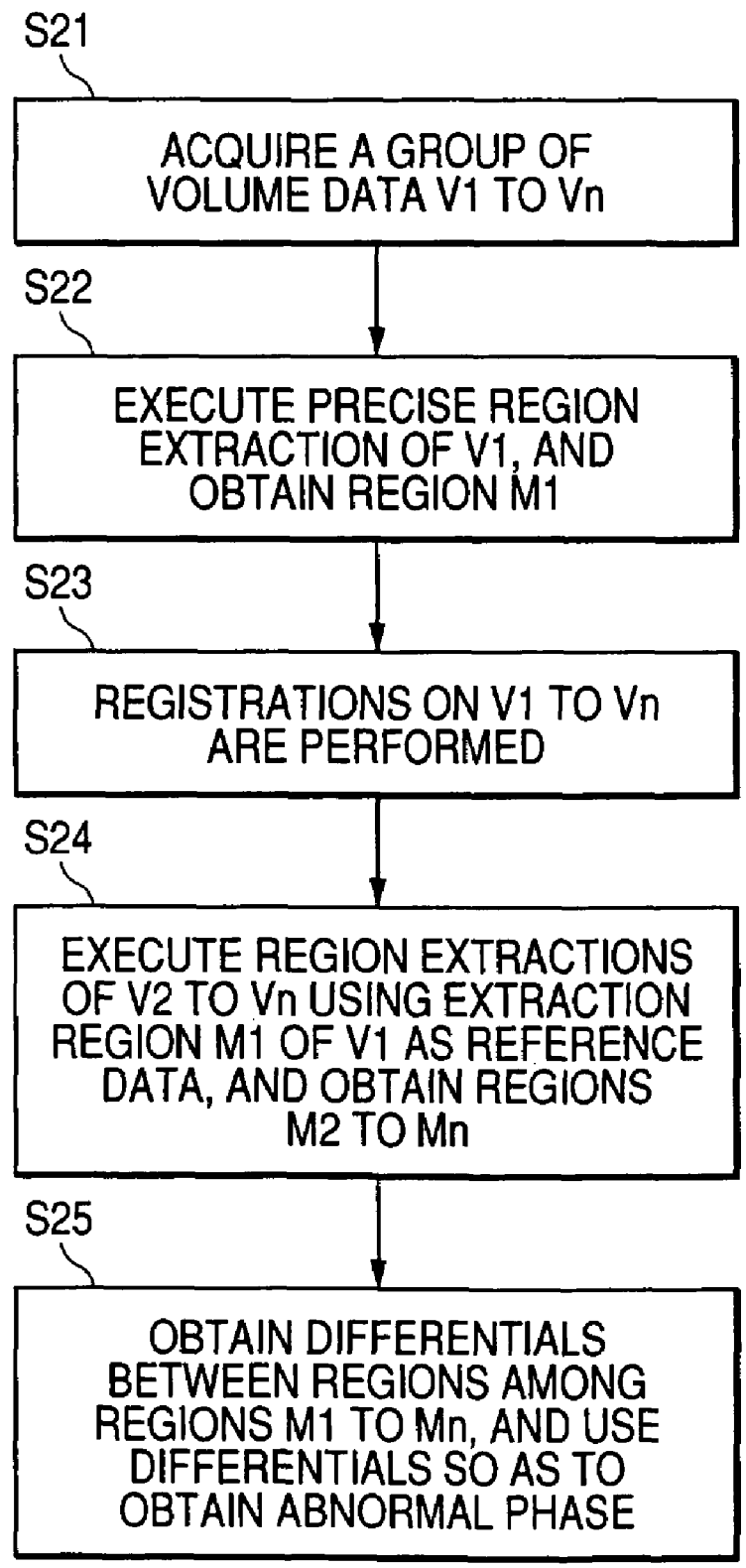
FIG. 7 is a flowchart of an image processing method in a related art.
Figure 8A:
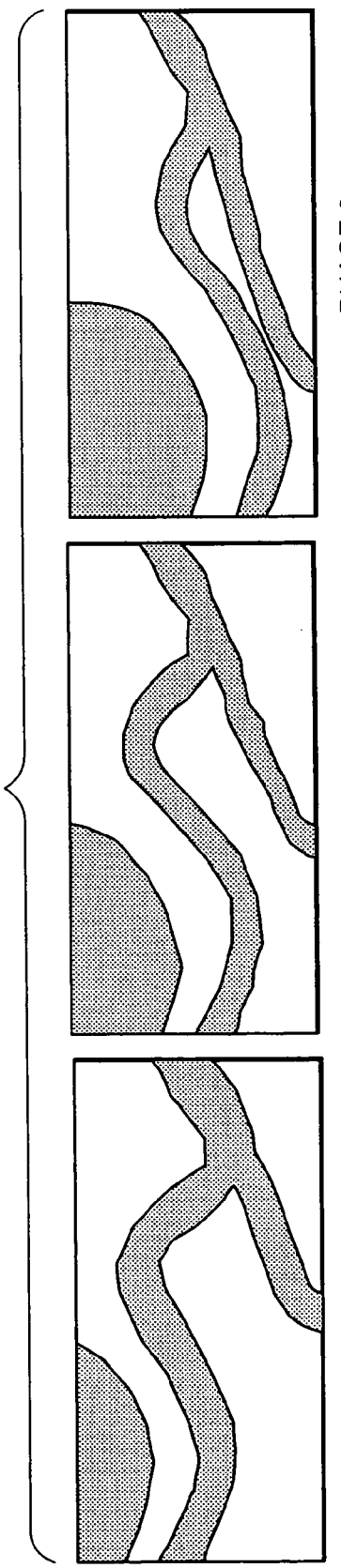
FIGS. 8A and 8B are schematic representations of executing region extraction of a heart and a vessel in continuous time (phases 1 to 3).
Figure 8B:
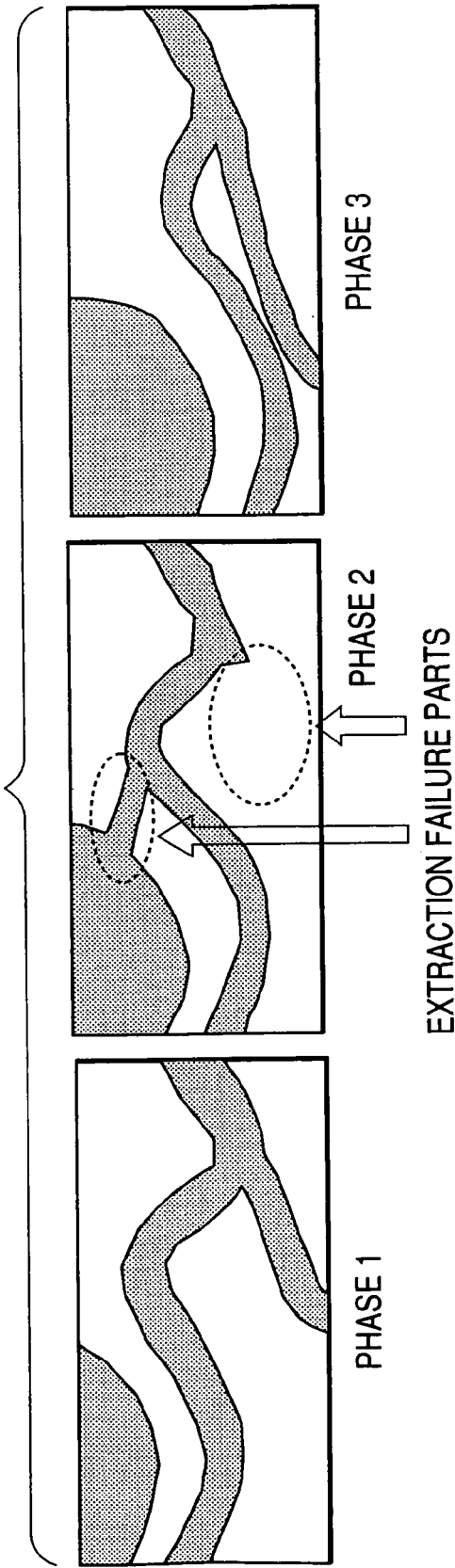

FIG. 6 is a flowchart of the image processing method of the embodiment. That is, in the image processing method of the embodiment, first a group of volume data V1 to Vn are acquired using an image diagnosis apparatus (step S11). Next, region extraction of the volume data V1 to the volume data Vn is executed, and regions M1 to Mn are obtained (step S12). In the embodiment, the region extraction need not be precise, and therefore a user command and a large amount of calculation are not required.

Next, the skeltonization is performed on the regions M1 to Mn so as to obtain paths L1 to Ln (step S13). Then, nodes and branches of the paths L1 to Ln are extracted (step S14). The nodes and the branches of the paths L1 to Ln are compared so as to obtain an abnormal phase (step S15). Accordingly, highly flexible anomaly detection can be accomplished.

According to the image processing method according to the embodiment, the region extraction and the structure information calculation are performed directly and respectively from a group of volume data without performing registration, etc., so that the calculation amount can be decreased. The processing corresponding to the registration processing in the related art is performed after the structure information is acquired, so that the processing is simplified. In additions, since a comparison is made between the structure information acquired independently from the respective phases to detect the anomaly, the reliability of the region extraction result can be determined. Moreover, the re-calculation of the region extraction of the failure part can be performed, so that more precise region extraction can be accomplished.

Furthermore, the structure information is further obtained from the extraction region and is used in such a manner that the center line of the vessel is obtained and a comparison is made between the center lines, for example. Thus, in performing region extraction of a predetermined biological part from the volume data, the phase containing a failure part can be obtained with a small calculation amount.

Embodiments of the invention can be also achieved by a computer readable medium in which a program code (an executable program, an intermediate code program, and a source program) according to the above described image processing method is stored so that a computer can read it, and by allowing a computer (or a CPU or an MCU) to read out the program (software) stored in the storage medium and to execute it.

The computer readable medium includes, for example, a tape-type medium, such as a magnetic tape or a cassette tape, a disc-type medium including a magnetic disc, such as a floppy (a registered trademark) disc or a hard disc, and an optical disc, such as CD-ROM/MO/MD/DVD/CD-R, a card-type medium, such as an IC card (including a memory card) or an optical card, and a semiconductor memory, such as a mask ROM, an EPROM, an EEPROM, or a flash ROM.

Further, the computer may be constituted such that it can be connected to a communication network, and the program may be supplied thereto through the communication network. The communication network includes, for example, the Internet, the Intranet, an intranet, an extranet, a LAN, an ISDN, a VAN, a CATV communication network, a virtual private network, telephone lines, a mobile communication network, and a satellite communication network. A transmission medium for constituting the communication network includes, for example, wire lines, such as IEEE1394, USB, power lines, cable TV lines, telephone lines, and ADSL lines, infrared rays, such as IrDA or a remote controller, and wireless lines, such as Bluetooth (a registered trademark), 802.11 Wireless, HDR, a mobile communication network, satellite lines, and a terrestrial digital broadcasting network. In addition, the program may be incorporated into carrier waves and then transmitted in the form of computer data signals.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing method comprising:
   providing at least one processor;
   acquiring structure information from each volume data in a group of volume data including a plurality of phases, each of the structure information corresponding to each volume data in the group of volume data, and each of the structure information including at least one of a path, a node of the path and a branch of the path; and
   detecting an anomaly in the structure information by comparing the structure information of different volume data in the group of volume data with each other, wherein the step of comparing includes determining the existence/non-existence of at least one of the node of the path and the branch of the path,
   wherein the steps of acquiring and detecting are performed by the at least one processor.

2. The image processing method as claimed in claim 1, wherein the structure information includes surface information.

3. The image processing method as claimed in claim 1, wherein the structure information includes coordinate information.

4. The image processing method as claimed in claim 1, wherein the phases are in time-series.

5. The image processing method as claimed in claim 1, further comprising:
   generating region information from the structure information.

6. The image processing method as claimed in claim 1, further comprising:
   recalculating the structure information corresponding to the phase in which the anomaly is detected in the structure information.

7. A computer readable medium storing a program including instructions for permitting a computer to perform image processing, said instructions comprising:

acquiring structure information from each volume data in a group of volume data including a plurality of phases, each of the structure information corresponding to each volume data in the group of volume data, and each of the structure information including at least one of a path, a node of the path and a branch of the path; and detecting an anomaly in the structure information by comparing the structure information of different volume data in the group of volume data with each other, wherein said comparing includes determining the existence/non-existence of at least one of the node of the path and the branch of the path.

8. The computer readable medium as claimed in claim 7, wherein the structure information includes surface information.

9. The computer readable medium as claimed in claim 7, wherein the structure information includes coordinate information.

10. The computer readable medium as claimed in claim 7, said instructions further comprising:

constructing region information from the structure information.

11. The computer readable medium as claimed in claim 7, said instructions further comprising:

re-calculating the structure information corresponding to the phase in which the anomaly is detected in the structure information.

12. The computer readable medium as claimed in claim 7, wherein the phases are in time-series, wherein a first volume data of the group of volume data corresponds to a first phase in the time-series;

wherein a second volume data of the group of volume data corresponds to a second phase in the time-series, the second phase being subsequent to the first phase in the time-series, wherein a third volume data of the group of volume data corresponds to a third phase in the time-series, the third phase being subsequent to the second phase in the time series, and wherein the structure information corresponding to the second volume data is compared with the structure information corresponding to at least one of the first volume data and the third volume data.

13. The image processing method as claimed in claim 4, wherein a first volume data of the group of volume data corresponds to a first phase in the time-series;

wherein a second volume data of the group of volume data corresponds to a second phase in the time-series, the second phase being subsequent to the first phase in the time-series, wherein a third volume data of the group of volume data corresponds to a third phase in the time-series, the third phase being subsequent to the second phase in the time series, and wherein the structure information corresponding to the second volume data is compared with the structure information corresponding to at least one of the first volume data and the third volume data.

14. An image processing apparatus storing a program for executing an image processing, the image processing comprising:

acquiring structure information from each volume data in a group of volume data including a plurality of phases, each of the structure information corresponding to each volume data in the group of volume data, and each of the structure information including at least one of a path, a node of the path and a branch of the path; and detecting an anomaly in the structure information by comparing the structure information of different volume data in the group of volume data with each other, wherein said comparing includes determining the existence/non-existence of at least one of the node of the path and the branch of the path.

15. The image processing apparatus as claimed in claim 14, wherein the phases are in time-series.

16. The image processing apparatus as claimed in claim 14, wherein the structure information includes surface information.

17. The image processing apparatus as claimed in claim 14, wherein the structure information includes coordinate information.

18. The image processing apparatus as claimed in claim 14, said image processing further comprising:

constructing region information from the structure information.

19. The image processing apparatus as claimed in claim 14, said image processing further comprising:

re-calculating the structure information corresponding to the phase in which the anomaly is detected in the structure information.

20. The image processing apparatus as claimed in claim 15, wherein a first volume data of the group of volume data corresponds to a first phase in the time-series;

wherein a second volume data of the group of volume data corresponds to a second phase in the time-series, the second phase being subsequent to the first phase in the time series, wherein a third volume data of the group of volume data corresponds to a third phase in the time-series, the third phase being subsequent to the second phase in the time series, and wherein the structure information corresponding to the second volume data is compared with the structure information corresponding to at least one of the first volume data and the third volume data.

* * * * *